United States Patent [19]

Kanesaki et al.

[11] Patent Number: 5,384,380
[45] Date of Patent: Jan. 24, 1995

[54] POLYMERIZABLE COMPOSITIONS AND HIGH REFRACTIVE PLASTIC LENS OBTAINED THEREFROM

[75] Inventors: Hiroyuki Kanesaki; Kouji Uegami, both of Amagasaki; Keishiro Nagao, Ikoma, all of Japan

[73] Assignee: Daiso Co., Ltd., Osaka, Japan

[21] Appl. No.: 181,124

[22] Filed: Jan. 13, 1994

[30] Foreign Application Priority Data

Jan. 14, 1993 [JP] Japan .................. 5-004795

[51] Int. Cl.⁶ ............................................ C08G 18/04
[52] U.S. Cl. ....................... 526/292.9; 526/313; 528/69; 528/75; 523/106; 351/160 R; 359/642
[58] Field of Search ............... 526/292.9, 313; 528/69, 528/75; 523/106; 350/321; 351/160 R

[56] References Cited

U.S. PATENT DOCUMENTS

| | | | |
|---|---|---|---|
| 4,369,298 | 1/1983 | Kida et al. | 526/313 |
| 4,985,472 | 1/1991 | Aosai et al. | 522/64 |
| 5,147,959 | 9/1992 | Nishimoto et al. | 528/48 |

FOREIGN PATENT DOCUMENTS

| | | |
|---|---|---|
| 58-14449 | 3/1983 | Japan . |
| 58-72101 | 4/1983 | Japan . |
| 58-164615 | 9/1983 | Japan . |
| 60-51706 | 3/1985 | Japan . |
| 60-249101 | 12/1985 | Japan . |
| 60-258501 | 12/1985 | Japan . |
| 61-200501 | 9/1986 | Japan . |
| 63-29701 | 2/1988 | Japan . |
| 63-159460 | 7/1988 | Japan . |
| 63-191812 | 8/1988 | Japan . |
| 63-193914 | 8/1988 | Japan . |
| 63-215706 | 9/1988 | Japan . |
| 1-103616 | 4/1989 | Japan . |
| 2-22601 | 1/1990 | Japan . |
| 2-84406 | 3/1990 | Japan . |
| 2-111743 | 4/1990 | Japan . |
| 2-150410 | 6/1990 | Japan . |
| 3-72301 | 3/1991 | Japan . |
| 3-136002 | 6/1991 | Japan . |
| 4-80212 | 3/1992 | Japan . |
| 4-80213 | 3/1992 | Japan . |
| 4-152301 | 5/1992 | Japan . |

*Primary Examiner*—Maurice J. Welsh
*Attorney, Agent, or Firm*—Armstrong, Westerman, Hattori, McLeland & Naughton

[57] ABSTRACT

A polymerizable composition is provided which is constituted by adding isocyanate by 0.1 to 2 equivalent to the alcoholic hydroxyl group in a mixture dissolving component A prescribed below by 20 to 60 parts by weight to a total of 80 to 40 parts by weight of component B and component C in the ratio specified below:

[Component A]
  A multifunctional (meth)acrylate possessing at least one alcoholic hydroxyl group, and also possessing at least one aromatic ring replaced by at least one halogen atom other than fluorine or phenyl group, and two or more (meth)acryloyl groups in a molecule:

[Component B]
  A multifunctional (meth)acrylate possessing at least one aromatic ring having neither halogen atom nor phenyl group as substituent, and possessing two or more (meth)acryloyl groups in a molecule, or a mixture of radically polymerizable multifunctional unsaturated monomer including the compound; 5 to 80 wt. %:

[Component C]
  A mixed solution of a styrene type compound, or a radically polymerizable monofunctional unsaturated monomer including the compound; 95 to 20 wt. %.

15 Claims, No Drawings

POLYMERIZABLE COMPOSITIONS AND HIGH REFRACTIVE PLASTIC LENS OBTAINED THEREFROM

FIELD OF THE INVENTION

The present invention relates to plastic lens of high refractive index and low specific gravity excellent in impact resistance, and polymerizable compositions to be used as materials thereof.

DESCRIPTION OF THE PRIOR ART

Recently the use of plastics is rapidly spreading in lenses for optical apparatus and lenses for spectacles, and those of lower cost and higher processability are being demanded.

Hitherto, as the visual acuity correction lenses, polymers mainly composed of diethylene glycol bisallyl carbonate have been used. However, the diethylene glycol bisallyl carbonate is low in refractive index, that is, 1.50, and therefore the edge becomes thick in the lens for high diopter, and the lightness of weight which is a feature of plastic lens cannot be effectively utilized and the beauty of appearance is spoiled.

To improve these defects, numerous compounds capable of adding a refractive index of 1.59 or more to the resin have been unveiled. For example, resin compositions mainly composed if bis(2-(meth)acryloyloxyethyl) ether of tetrabromobisphenol A (Japanese Patent Publication 83-14449, Japanese Unexamined Patent Publications 83-72101, 85-258501, 88-159460, 88-191812, 83-215706, etc.), and resin compositions mainly composed of bis(3-(meth)acryloyloxy-2-hydroxypropyl) ether of tetrabromobisphenol A (Japanese Unexamined Patent Publications 88-191812, 88-215706, etc.) are known to be used as materials for plastic lenses possessing excellent performances in formability, transparency, heat resistance and others, as well as high refractive index. These compounds, however, lack the functional group contributing to adhesion to glass mold, and therefore they are easily separated from the mold at the time of polymerization, and lowering of yield in forming cannot be avoided, and moreover it is hard to coat because the adhesion between the surface of forming and the hard coat film is poor. Still more, the polymer crosslinked in a mesh form is a hard but brittle thermosetting polymer, and it is easily broken by impact, not possessing enough impact resistance conform to the standard of the drop ball test (FDA drop ball impact strength) required in the United States, which was a major defect. Lately, the former resin compositions are put on market, and high refractive plastic lenses with the refractive index of 1.595 and Abbe's number of 32 are manufactured, but in addition to the above demerits, another problem is the heavy specific gravity of 1.39, and in the latter resin compositions, properties such as the refractive index, specific gravity, formability, and impact resistance have not been disclosed at all in the published literature.

Resin compositions mainly composed of bis(2-hydroxy ethyl) ether of tetrabromobisphenol A and polyisocyanate (for example, Japanese Unexamined Patent Publications 83-164615, 86-200501, 88-29701, 88-193914) are excellent in adhesion with the glass mold when curing and adhesion with the hard coat film when coating because of the isocyanate group, but bis(2-hydroxyethyl) ether of tetrabromobisphenol A is likely to precipitate in the resin solution because of its poor solubility, and the polyisocyanate is sensitive to the moisture in the resin solution or in the atmosphere, and hence the working efficiency is poor. Yet, the obtained polymer is a straight-chain thermoplastic polymer and is hence excellent in impact resistance, but it becomes soft at high temperature, and is hence inferior in the forming property and heat resistance.

Resin compositions mainly composed of 2-(meth)acryloyloxyethyl-2'-hydroxyethyl ether of tetrabromobisphenol A and polyisocyanate (for example, Japanese Unexamined Patent Publications 85-51706, 85-249101), or resin compositions mainly composed of the compound shown in formula (II) (hereinafter compound II) and polyisocyanate

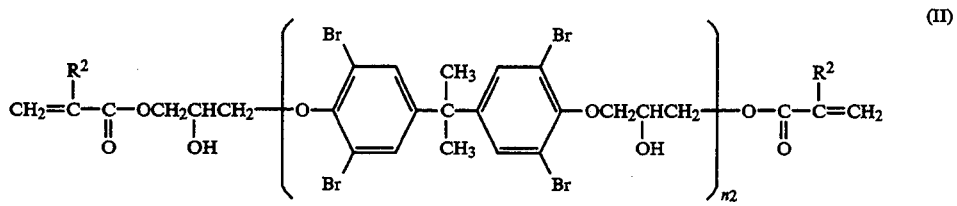

(II)

wherein $R^2$ is a hydrogen atom or a methyl group, and $n_2$ is a number of 1–6.

(For example, Japanese Unexamined Patent Publication 91-72301) are known to be used as materials for high refractive plastic lenses, possessing excellent performances in formability, transparency, heat resistance and others, and also excellent in adhesion with the glass mold when hardening or contact with the hard coat film when coating. Lately, the former resin compositions are put on market, and high refractive plastic lenses with refractive index of 1.61 and Abbe's number of 32 are manufactures, but the problem was still the high specific gravity of 1.41. In the latter resin compositions, in the publication, the high refractive plastic lens excellent in impact resistance with the refractive index of 1.586 to 1.606 and Abbe's number of 30.9 to 32.5 is unveiled, but the problem was the high specific gravity of 1.35 to 1.48.

Herein, to heighten the refractive index from the study on the relation between the refractive index of a substance and its molecule structure, it is already known effective to introduce aromatic ring, halogen atom other than fluorine, and sulfur atom, and the halogen atom other than fluorine is excellent in that the refractive index can be heightened without lowering the Abbe's number, but the demerit is that the specific gravity is increased. In all these known publications, since the refractive index is raised by introducing the heavy bromine atoms, the refractive index of the plastic lenses if 1.59 or higher, but the specific gravity is 1.35 or heavier. So far, the greatest demerit of plastic lens has been the lower refractive index as compared with the glass, and it was hence the primary object to heighten the refractive index and little attention has been paid to the specific gravity. It is known from the fact that the specific gravity is not mentioned in most of the publications. More recently, however, as several materials have been proposed for high refractive plastic lens, the market is changing into the direction of seeking the materials excellent in the aspect of specific gravity that has been hitherto overlooked.

Considering the problem of high specific gravity alone, it is evident that the specific gravity can be lowered by forming by mixing compounds of low specific gravity that can be copolymerized with components in the resin compositions, but such compounds with low specific gravity are also low in refractive index, and lowering of refractive index of plastic lens cannot be avoided, and when the specific gravity was lowered to 1.30 or less, the refractive index was 1.59 or less in most cases.

It is shown that the resin compositions mainly composed of bis(2-(meth)acryloyloxyethyl) ether of diphenylbisphenol A or bis(3-(meth)acryloyl oxy-2-hydroxypropyl) ether of diphenylbisphenol A (for example, Japanese Unexamined Patent Publication 90-111743) can be used as the materials for high refractive plastic lenses, but is only mentioned in the publication that the high refractive plastic lens with the refractive index of 1.63 was obtained in the former resin composition, other properties are not disclosed at all, and in the latter resin composition, properties such as refractive index, specific gravity, formability, and impact resistance were not stated at all. In the publication, a conjugate aromatic ring is introduced in order to heighten the refractive index, and the specific gravity may be kept low, but the Abbe's number is extremely lowered, which posed another problem of significant eye fatigue.

Resin compositions mainly composed of isopropenyl-α, α-dimethylbenzyl isocyanate and polythiol (e.g. Japanese Unexamined Patent Publication 90-22601), resin compositions mainly composed of 2-(meth)acryloyloxyethyl isocyanate, and a compound possessing at least one of hydroxy group, mercapto group, and amino group (e.g. Japanese Unexamined Patent Publications 90-150410, 92-80212, 92-80213), and resin compositions mainly composed of (meth)acryloyl isocyanate and a compound possessing at least one of hydroxy group, mercapto group and amino group (e.g. Japanese Unexamined Patent Publication 90-150410) are presented to be used as materials for plastic lenses with high refractive index and low specific gravity, but compounds having mercapto group have mostly unpleasant smell, and unpleasant smell is released when pouring, forming or processing, which is a problem in working performance, or when a compound possessing at least one of hydroxy group and amino group is used, introducing halogen atoms other than fluorine in order to heighten the refractive index, the specific gravity becomes heavy, on the other hand introducing conjugate aromatic ring or conjugate condensation ring, it is evident that the Abbe's number if lowered, and these were not preferable for plastic lens.

Therefore, hitherto, there has been known no resin composition well balanced in the requirements for plastic lenses, that is, high refractive index (1.59 or more), high Abbe's number (30 or more), low specific gravity (1.30 or less), colorless and transparent property, excellent working efficiency, formability and heat resistance, and superior impact resistance enough to be approved by the standard of the drop ball test (FDA drop fall impact strength) required in the United States.

SUMMARY OF THE INVENTION

It is hence a primary object of the invention to present a polymerizable compound of high refractive index and low specific gravity enhanced in impact resistance without sacrificing the refractive index and Abbe's number and without worsening the working efficiency and forming property.

It is other object of the invention to present a high refractive index plastic lens excellent in impact resistance by copolymerization of the polymerizable compound.

A first aspect of the invention relates to a polymerizable composition constituted by adding isocyanate by 0.1 to 2 equivalent to the alcoholic hydroxyl group in a mixture dissolving component A prescribed below by 20 to 60 parts by weight to a total of 80 to 40 parts by weight of component B and component C in the ratio specified below.

[Component A]

A multifunctional (meth)acrylate possessing at least one alcoholic hydroxyl group, and also possessing at least one aromatic ring replaced by at least one halogen atom other than fluorine or phenyl group, and two or more (meth)acryloyl groups in a molecule.

[Component B]

A multifunctional (meth)acrylate possessing at least one aromatic ring having neither halogen atom nor phenyl group as substituent, and posessing two or more (meth)acryloyl groups in a molecule, or a mixture of radically polymerizable multifunctional unsaturated monomer including the compound; 5 to 80 wt. %.

[Component C]

A mixed solution of a styrene type compound, or a radically polymerizable monofunctional unsaturated monomer including the compound; 95 to 20 wt. %.

A second aspect of the invention relates to a polymerizable composition constituted by adding a glycidyl ether of substituted phenol by 5 to 20 parts by weight to 100 parts by weight of the polymerizable composition.

A third aspect of the invention relates to a high refractive plastic lens excellent in impact resistance by copolymerizing these polymerizable compositions in the presence of a radical polymerization initiator and an urethane polymerization initiator.

Throughout the specification herein, (meth)acrylate refers to acrylate and methacrylate, and (meth)acryloyl refers to acryloyl and methacryloyl, collectively.

The invention presents a plastic lens which is balanced well, rigid, safe and light, possessing high refractive index (1.59 or more), high Abbe's number (30 or more), and low specific gravity (1.30 or less), and excellent in working efficiency, forming property, heat resistance, and impact resistance, and a composition for polymerization to be used as a material thereof.

DESCRIPTION OF THE PREFERRED EMBODIMENTS

The polymerizable composition of the invention is described more specifically below. The component A in the composition is a multifunctional (meth)acrylate possessing at least one alcoholic hydroxyl group, and also possessing at least one aromatic ring replaced by at least one halogen atom other than fluorine or phenyl group, and two or more (meth)acryloyl groups in a molecule, and this compound is an essential element for providing the plastic lens with a high refractive index and a sufficient transparency and impact resistance. A preferred example of component A is a compound expressed in the following formula (I) (hereinafter called compound I).

component B and component C. Generally, $n_1$ of component I or $n_2$ of component II is in a range of 1 to 6, and it is desired to be greater than 1 in order to obtain a plastic lens excellent in impact resistance, but if exceeding 6, lowering of solubility is the problem. More specific examples of component A include epoxy(meth)acrylate obtained by reaction of (meth)arcylic acid to an epoxy resin obtained from epichlorohydrin, and tetrabromobisphenol A, tetrabromobisphenol F, tetrabromobisphenol S or tetrabromobiphenol; epoxy(meth) acrylate obtained by reaction of (meth)acrylic acid to an epoxy resin obtained from epichlorohydrin and diphenyl bisphenol A, diphenyl bisphenol F, diphenyl bisphenol S or diphenyl biphenol; and epoxy(meth)acrylate obtained by reaction of (meth)acrylic acid to an epoxy resin obtained from polybromophenol novolak and epichlorohydrin.

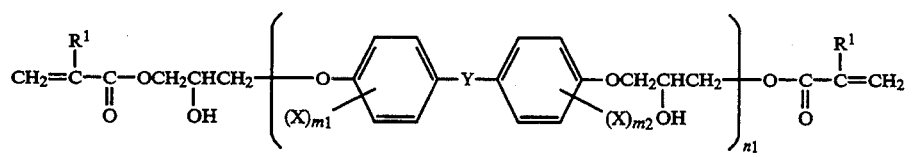

(I)

wherein $R^1$ is a hydrogen atom or a methyl group, X is a halogen atom other than fluorine or phenyl group, $Y^1$ is —C(CH$_3$)$_2$—, —CH$_2$—, —SO$_2$— or single bond, each of $m_1$ and $m_2$ is an integer of 1 or 2, which may be identical or different, and $n_1$ is a number of 1-6.

Of the compounds I, those possessing multiple aromatic rings having substituents of halogen atoms other than fluorine in the molecule are high in refractive index and high in Abbe's number, and others possessing aromatic rings substituted by multiple phenyl groups are high in refractive index and low in specific gravity. Besides, the more oligomer components possesing two bisphenol or bisphenol units coupled with 1,3-glycerin diether linkage, and possessing radically polymerizable (meth)acryloyl group at the end is contained, so much the better the impact resistance is. Further the compounds possess alcoholic hydroxyl groups that can react with isocyanate groups which are effective for enhancing the heat resistance, formability and the like, and yet it is possible to obtain at a relatively low cost. Among these compounds I, a more preferable example is the following compound II as stated above.

The component B in the composition is a multifunctional (meth)acrylate possessing at least one aromatic ring having neither halogen atom nor phenyl group as substituent, and posessing two or more (meth)acryloyl groups in a molecule, or a mixture of radically polymerizable multifunctional unsaturated monomer including the compound; 5 to 80 wt. %. The multifunctional (meth)acrylate does not contain halogen atom or the like, and is hence inferior to the component A in the aspect of refractive index, but is an essential component for lowering the specific gravity and maintaining sufficient heat resistance and crosslinking density. Actually, the heat resistance is lowered extremely in the product removing the component B from the polymerizable composition of the invention, or in the product having the component B replaced by the aliphatic multifunctional (meth)acrylate. It is, of course, possible to blend the component B with aliphatic multifunctional (meth)acrylate. Preferred examples of the component B are the compound expressed in formula (III) (hereinafter called compound III) and the compound expressed in formula (V) (hereinafter called compound V).

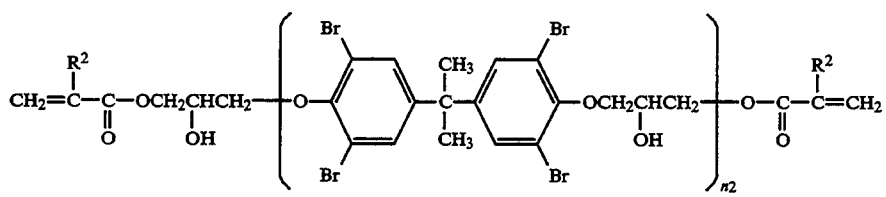

(II)

wherein $R^2$ is a hydrogen atom or a methyl group, and $n_2$ is a number of 1–6.

The compounds I or II are generally sold as mixtures of several compounds differing in the reaction molar ratio consisting of bisphenol unit and epichlorohydrin, but it is not necessary to use a single component possessing a specific molecular weight for the purpose of the invention, that is, by refining until $n_1$ or $n_2$ becomes an integer, and a mixture having a wide distribution of molecular weight may be directly used. However, since the component A is solid or very viscous liquid at room temperature, it must be dissolved in a mixed solution of

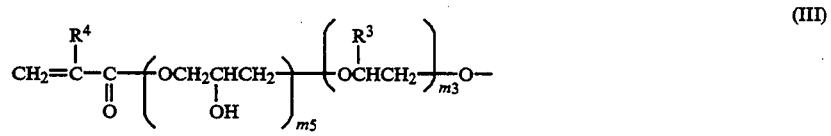

(III)

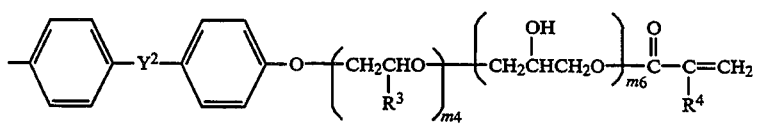

wherein each of $R^3$ and $R^4$ hydrogen atom or a methyl group, $Y^2$ is —C(CH$_3$)$_2$—, —CH$_2$—, —SO$_2$— or single bond, each of $m_3$ and $m_4$, which may be identical or different, is an integer such that the sum thereof is 2–30, and each of $m_5$ and $m_6$, which may be identical or different, is 0 or 1.

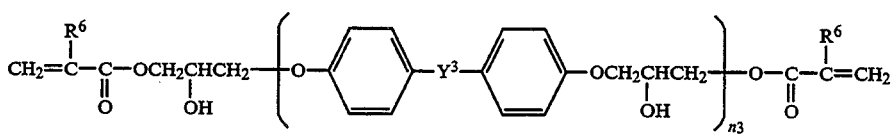

wherein $R^6$ is a hydrogen atom or a methyl group, $Y^3$ is —C(CH$_3$)$_2$—, —CH$_2$—, —SO$_2$— or single bond, and $n_3$ is a number of 1–6.

They are easily obtained from bisphenols and are available at low cost. A particularly preferred example of the compound III is the compound expressed in formula (IV) (hereinafter called compound IV).

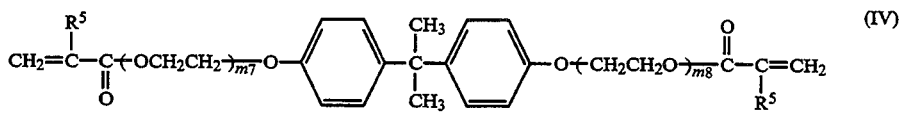

wherein $R^5$ is a hydrogen atom or a methyl group, and each of $m_7$ and $m_8$, which may be identical or different, is an integer such that the sum thereof is 2–30.

The compounds III to V are, same as the compounds I and II, available as commercial products of mixtures of several kinds of compounds differing in the reaction molar ratio of bisphenol unit and epichlorohydrin and/or alkylene oxide, but it is not necessary to use a single component possessing a specific molecular weight for the purpose of the invention, that is, by refining until $m_3$ to $m_8$ and $n_3$ become specific integers, and a mixture having a wide distribution of molecular weight may be directly used. Of the compounds III to V, $m_3$ to $m_8$ and $n_3$ may be preferably in the range specified above so as not to break the balance of properties of formed products. More specifically, examples of the component B include bis(2-(meth)acryloyl oxyethyl) ether, bis(2-(2'-(meth)acryloyloxypropoxy) propyl) ether, bis(ω-(meth)acryloyloxypoly(ethoxy) ethyl) ether, bis(3-(meth)acryloyloxy-2-hydroxypropyl) ether and bis(2-(3'-(meth)acryloyloxy-2'-hydroxypropoxy) propyl) ether of bisphenol A, bisphenol F, bisphenol S, and biphenol and the like, bis(2-(meth)acryloyloxyethyl) phthalate, 2,2-bis(2-(meth)acryloyloxymethyl)butyl benzoate, urethane prepolymer of 3-(meth)acryloyloxy-2-hydroxypropoxybenzene and hexamethylene diisocyanate, and the like, and their mixtures.

Other radically polymerizable multifunctional unsaturated monomers that can be used together with the multifunctional (meth)acrylate compounds include aliphatic multifunctional (meth)acrylates, divinyl compounds, diallyl compounds, and their mixtures. These unsaturated monomers are smoothly copolymerizable with the component A and multifunctional (meth)acrylate compounds, and can be blended in the component B, but the blending ratio into the component B is preferred to be 20% or less so as not to break the balance of properties of the formed products.

Preferred examples of aliphatic multifunctional (meth) acrylates include ethyleneglycol dimethacrylate, diethylene glycol dimethacrylate, 1,3-butanediol dimethacrylate, trimethylolpropane tri(meth)acrylate, pentaerythritol tetra(meth)acrylate, dipentaerythritol hexa(meth)acrylate, and their mixtures.

Preferred examples of divinyl compounds include divinylbenzene, diisopropenylbenzene, and their mixtures.

Preferred examples of diallyl compound include diallyl malonate, diallyl succinate, diallyl maleate, diallyl fumarate, diallyl phthalate, diallyl diphenate, diallyl naphthalene dicarboxylate, other diallyl esters, and ethyleneglycol bisallylcarbonate, diethyleneglycol bisallylcarbonate, bisphenol A bisallylcarbonate, biphenol bisallylcarbonate, bisphenol A bis(2-allyloxycarbonyl oxyethyl) ether, other bisallylcarbonates, and their mixtures.

The component C in the composition is a mixed solution of styrene type compound, or a radically polymerizable monofunctional unsaturated monomer including the styrene type compound, and the styrene type compound is optimum as the copolymerizable solvent of component A because it smoothly dissolves the component A and the refractive index of the single polymer is as high as 1.58 or more.

Preferred examples of styrene type compound include styrene, α-methylstyrene, vinyl toluene, chlorostyrene, bromostyrene, and their mixtures.

Examples of other radically polymerizable monofunctional unsaturated monomers that can be used together with the styrene type compound include monofunctional (meth)acrylate, maleates, fumarates, monoallyl compound, and their mixtures. These unsaturated monomers are smoothly copolymerizable with the component A, component B and styrene type compounds, and can be blended in the component C, but the blending ratio into the component C is preferred to be 20% or less so as not to break the balance of properties of the formed products.

Preferred examples of monofunctional (meth)acrylates include methyl (meth)acrylate, ethyl ((meth)acrylate, butyl (meth)acrylate, 2-ethylhexyl (meth)acrylate, cyclohexyl (meth)acrylate, phenyl (meth)acrylate, bromophenyl (meth)acrylate, dibromophenyl (meth)acrylate, benzyl (meth)acrylate, phenyloxyethyl (meth)acrylate, bromophenyloxyethyl (meth)acrylate, tribromophenyloxyethyl (meth)acrylate, 3-(meth)acryloyloxy-2-hydroxypropoxybenzene, 2-(meth)acryloyloxyethyl-2'-hydroxyethyl phthalate, and their mixtures.

Preferred examples of maleates include diethyl maleate, dibutyl maleate, bis(2-ethylhexyl) maleate, dibenzyl maleate, diphenyl maleate, bis(dibromophenyl) maleate, and their mixtures.

Preferred examples of fumarates include diethyl fumarate, dibutyl fumarate, bis(2-ethylhexyl) fumarate, dibenzyl fumarate, diphenyl fumarate, bis(tribromophenyl) fumarate, and their mixtures.

Preferred examples of monoallyl compound include allyl acetate, allyl propionate, allyl benzoate, other allyl esters, and phenyl allyl carbonate, p-phenylphenyl allyl carbonate, bromophenyl allyl carbonate, phenyloxyethyl allyl carbonate, o-phenylphenyloxyethyl allyl carbonate, dibromophenyl oxyethyl allyl carbonate, other allyl carbonates, and their mixtures.

The isocyanate to be added to the polymerizable compound of the invention may be either monoisocyanate or polyisocyanate, and their mixtures may be also used. By adding isocyanate to the mixture of components A, B, C by 0.1 to 2 equivalent of hydroxyl group, the unreacted or excess isocyanate group forms hydrogen bond or urethane bond with the functional group on the surface of the glass mold and hard coat film when hardening the formed product or coating respectively, which contributes to improvement of adhesion in hardening of formed product or coating respectively, so that it is particularly excellent in that it is the factor for presenting superior forming property and processing property.

Preferred examples to be used as such monoisocyanate include non-yellowing aromatic monoisocyanates such as benzyl isocyanate, aliphatic monoisocyanates such as butyl isocyanates, alicyclic monoisocyanates such as cyclohexyl isocyanates, and their mixtures, and what is particularly preferable is the compound expressed in formula (VI) (hereinafter called compound VI).

$$\begin{array}{c} R^7 \\ | \\ CH_2=C-Z-N=C=O \end{array} \quad (VI)$$

wherein $R^7$ is a hydrogen atom or a methyl group, Z is

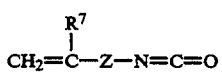

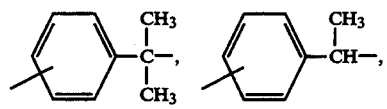

or

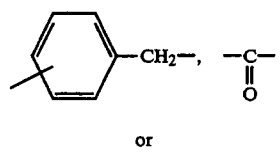

Specific examples include monoisocyanates possessing styrene skeleton such as vinyl benzyl isocyanate, isopropenyl benzyl isocyanate, vinyl-α-methylbenzyl isocyanate, isopropenyl-α, α-dimethylbenzyl isocyanate, and others possessing radically polymerizable functional groups in the molecules, aliphatic monoisocyanates possessing one or more (meth)acryloyl groups such as (meth)acryloyl isocyanate, (meth)acryloyloxyethyl isocyanate, and the like, and their mixtures, and what is particularly preferable is isopropenyl-α, α-dimethylbenzyl isocyanate possessing the tertiary isocyanate group which is relatively moderate in reaction with the alcoholic hydroxyl group, and isopropenyl group relatively moderate in the radical polymerization reaction, and the mixture containing the compound.

Preferred examples of polyisocyanate include non-yellowing aromatic polyisocyanates such as xylylene diisocyanate, bis(α, α-dimethylisocyanatomethyl)benzene and tris(α, α-dimethylisocyanatomethyl)benzene, aliphatic polyisocyanates such as hexamethylene diisocyanate, trimethylhexymethylene diisocyanate, and lysine diisocyanate, alicyclic polyisocyanates such as cyclohexane diisocyanate, bis(isocyanatomethyl)cyclohexane, isophorone diisocyanate, bis(isocyanatocyclohexyl)methane, and 2,2-bis(isocyanatocyclohexyl)propane, and their mixtures, and what is particularly preferred is bis(α, α-dimethylisocyanatomethyl)benzene possessing two tertiary isocyanate groups relatively moderate in the reaction with alcoholic hydroxyl group, and the mixture containing the compound.

It is thus a major feature of the invention that the plastic lens obtained by blending the component A containing oligomer component with high refractive index effective for enhancing the impact resistance, the component B with low specific gravity effective for enhancing the heat resistance, the component C with high refractive index and low specific gravity, and isocyanate with low specific gravity effective for enhancing the forming performance without sacrificing the preferred properties of other components, and copolymerizing the polymerizable composition in the presence of the radical polymerization initiator and urethane polymerization initiator is high in refractive index, high in Abbe's number, low in specific gravity, colorless, transparent, excellent in working efficiency, forming performance and heat resistance, and also excellent in impact resistance sufficient to be approved by the FDA drop ball test.

Incidentally, when glycidyl ether of substituted phenol is added to the polymerizable composition of the invention, although the compound itself is not closely related with polymerization, it presents sufficient impact resistance without sacrificing other properties to the plastic lens obtained by hardening and forming the polymerizable composition of the invention, and contributes to lowering of specific gravity easily, and moreover, lowers the degree of yellowness sufficiently. Besides, the plastic lens containing glycidyl ether presented a higher refractive index as compared with the the case not containing it, and even if the content of the component A required conventionally for heightening the refractive index was decreased, the refractive index could be maintained over 1.59, and hence the specific gravity could be lowered to 1.30 or less. However, if the content of the glycidyl ether exceeds a certain range, it adversely affects other properties, so that the range may be limited accordingly.

An example of using o-phenylphenyl glycidyl ether which is one of the glycidyl ethers as a component of composition for plastic lens has been already disclosed in the Japanese Unexamined Patent Publication 91-72301. That is, in the publication, it is described that the complicated three-dimensional compound obtained by making a part of o-phenylphenyl glycidyl ether participate in the reaction of the hydroxyl group of compound II and isocyanate group of polyisocyanate and the polymerization reaction of (meth) acryloyl group of compound II present excellent properties as optical lens, including the refractive index, Abbe's number, rigidity, transparency, impact resistance, machinability, polishing performance, and economy. However, when the present inventors prepared the formed product in the composition disclosed in the publication, though the impact resistance was sufficient to be approved by the FDA drop ball test, the degree of yellowness (b*) of the formed product was 1.3 or more and the coloring was considerably promoted, and as mentioned in the publication, the specific gravity was very heavy, around 1.40, and it was clear that stria and distortion could not be avoided. Besides, with increasing the content of glycidyl ether in order to lower the specific gravity, the hardness and heat resistance were lowered, and the stria became excessive, and satisfactory formed products could not be obtained. As a result, only by adding glycidyl ether, it was impossible to obtain a practically excellent plastic lens having high refractive index, high Abbe's number, low specific gravity, and sufficient impact resistance.

It is another feature of the invention that the plastic lens obtained by copolymerizing in the presence of the radical polymerization initiator and urethane polymerization initiator the polymerizable composition comprising the component A with high refractive index, the component B with low specific gravity effective for enhancing the heat resistance, the component C with high refractive index and low specific gravity, isocyanate with low specific gravity effective for enhancing the forming performance, and glycidyl ether of substituted phenol with high refractive index and lower specific gravity effective for enhancing the impact resistance is high in refractive index, high in Abbe's number, low in specific gravity, colorless, transparent, excellent in working efficiency, forming performance and heat resistance, and also excellent in impact resistance superior to that of the plastic lens obtained from the polymerizable composition comprising the component A, component B, component C and isocyanate.

As the glycidyl ether, one having the refractive index of 1.58 or more must be used, and if the refractive index is less than 1.58, the refractive index of the obtained resin is lowered, so that the desired high refractive plastic lens cannot be obtained. It is further advantageous to use glycidyl ether being liquid at room temperature because it is not only superior in compatibility with other components, but also usable as solvent of component A.

Preferred embodiments of such glycidyl ether of substituted phenol include o-phenylphenyl glycidyl ether, p-phenylphenyl glycidyl ether, other phenyl substituted phenyl glycidyl ethers, bromophenyl glycidyl ether, dibromophenyl glycidyl ether, other halogenophenyl glycidyl ethers, and their mixtures. What is particularly preferred among them is the phenyl substituted phenyl glycidyl ethers with lower specific gravity and their mixtures, and in particular o-phenylphenyl glycidyl ether and a mixture containing the compound are preferable.

As the composition ratio of component B and component C in the polymerizable composition of the invention, the component B is 5 to 80 wt. %, preferably 10 to 70 wt. %, the component C is 95 to 20 wt. %, preferably 90 to 30 wt. %, the component A is 20 to 60 wt. %, preferably 25 to 50 wt. % to the mixture of component B and component C of 80 to 40 wt. %, preferably 75 to 50 wt. %, the isocyanate if 0.1 to 2 equivalent, preferably 0.2 to 1.5 equivalent to the hydroxyl group in the mixture of the component A, component B, and component C, and the glycidyl ether of substituted phenol is 5 to 20 parts by weight, preferably 7 to 15 parts by weight of 100 parts by weight of the mixture of component A, component B, component C, and isocyanate. If out of these ranges, not only the properties of the formed products are largely sacrificed by lowering of refractive index, increase of specific gravity, and lowering of heat resistance and impact resistance, but also it is hard to dissolve the component A, and therefore, crystal components precipitate in the resin solution, and the liquid viscosity becomes too high, thereby spoiling the working efficiency, causing stria and separation, and forming problems such as insufficient polymerization.

The high refractive plastic lens of the invention is obtained by hardening the polymerizable composition while promoting urethane polymerization reaction and vinyl polymerization reaction simultaneously or progressively in the presence of urethane polymerization initiator and radical polymerization initiator according to the conventional method. For example, it is obtained by adding urethane polymerization initiator and radical polymerization initiator to the polymerizable composition of the invention, dissolving them completely, sufficiently degassing the dissolved gas under reduced pressure at room temperature, injecting the resin solution into the glass or metal mold held by elastomer gasket or spacer, and gradually heating it from 20°–40° C. to 80°–120° C. in 10–48 hours in an air oven. In particular, the combined use of two or more radical polymerization initiators differing in the temperature program in hardening and/or decomposition temperature is preferable for controlling the progress of the urethane polymerization reaction and vinyl polymerization reaction, and preventing sudden progress of polymerization reaction at specific temperature, thereby obtaining a uniform formed product with less distortion. Besides, the pre-polymerization method for obtaining a prepolymer by progressing either polymerization reaction to a certain extent before injecting into the mold is also effective for improving uniformity of formed product, and suppressing distortion and stria. For example, by adding urethane polymerization initiator to the polymerizable composition of the invention, and agitating them for 10 minutes to 24 hours, preferably 30 minutes to 10 hours at 0° to 80° C., preferably 20° to 60° C., thereby prepolymerizing the hydroxyl group and isocyanate group, the dissolved gas is sufficiently degassed under reduced pressure at room temperature, the radical polymerization initiator is added in succession to dissolve completely, and the resin is injected into the mold, thereby heating and polymerizing in the same manner.

Typical examples of urethane polymerization initiator used in the invention are dibutyl tin dilaurate, dibutyl tin dichloride, tin di-(2-ethylhexoate, other organic tin compounds, or N,N,N',N'-tetramethylbutane diamine, 1,4-diazabicyclo [2.2.2]octane, other aliphatic tertiary amines, and their mixtures, and representative examples of radical polymerization initiator include diisopropyl peroxydicarbonate, di-sec-butyl peroxydicarbonate, di-2-ethylhexyl peroxydicarbonate, other peroxidicarbonates, benzoyl peroxide, decanoyl peroxide, lauroyl peroxide, acetyl peroxide, other diacyl peroxides, tert-butyl peroxyisobutylate, tert-butyl peroxy-2-ethyl hexanate, tert-butyl peroxypivalate, other alkyloxy peresters, or azobis(isobutyronitrile), azobis (2,4-dimethylvaleronitrile), other azo compounds, and their mixtures.

The variety of these urethane polymerization initiator and radical polymerization initiator is not limited to one kind, but as the radical polymerization initiator, in particular, combined use of two or more polymerization initiators differing in the decomposition temperature according to the temperature program when hardening as mentioned above is the essential condition for obtaining a uniform formed product less in distortion. The content of each polymerization initiator is, in any case, 0.0001 to 10 parts by weight, preferably 0.0005 to 5 parts by weight to 100 parts by weight of the polymerizable composition of the invention. If less than 0.0001 part by weight, the polymerization reaction is not promoted sufficiently, while if exceeding 10 parts by weight, the distortion stress in the formed product increases, which may lead to formation of crack or lowering of impact resistance.

In manufacture of high refractive plastic lens of the invention, as required, a polymerization retarder and/or ultraviolet-absorber may be added by 0.01 to 20 wt. % to 100 parts by weight of the polymerizable composition. Herein, preferred examples of polymerization retarder include hydroquinone, p-tert-butylcatechol, p-methoxy phenol, n-octadecane 3-(4-hydroxy-3,5-di-tert-butylphenyl) propionate, other phenols, allyl phenyl ether, other allyl ethers, allyl benzenes, allyl sulfide, phenyl sulfide, other sulfides, phenyl sulfoxide, other sulfoxides, thiophenol, and other thiols. Preferred examples of ultraviolet absorber include 2-(2'-hydroxy-5'-tert-butylphenyl)benzotriazole, other benzotriazoles, 2,4-dihydroxybenzophenone, other benzophenones, p-tert-butylphenyl salicylate, and other salicylates.

EXAMPLES

This invention is illustrated by the following Examples.

In the following Examples, characteristic values of the obtained polymers of this invention were measured by the undermentioned methods:

(1) Refractive Index ($n_D$) and Abbe's number ($v_D$)

A test piece of 10×20×3 mm of the casting was prepared. Its index of refraction ($n_D$) and Abbe's number ($v_D$) at room temperature were measured using Abbe's refractometer "3T" of Atago Co. Ltd. As the contacting liquid, α-bromonaphthalene was used.

(2) Specific Gravity (d)

Preparing a test piece of 20×20×3 mm, its sp. gr. (d) was measured with "DENSIMETER D-1" of Toyo Seiki Seisakusho Co. Ltd.

(3) Degree of Yellowness (b*)

Preparing a test piece of 60×60×3 mm, its degree of yellowness was measured with colorimeter "CR-300" of Minolta Camera Co. Ltd.

It is desired that the degree of yellowness is closer to zero. Practically less than 1.0 is preferable.

(4) Impact Resistance

Ten test pieces with 78 mm in dia., 0.1 m in radius of curvature and 1.2 mm in central thickness were prepared. A steel ball weighing 16.2 g (10/16 inch dia.) was dropped on the test pieces from a level of 1.27 m. The outcome is shown by "G" for "good", when all ten pieces were not broken, but it is shown by "P" for "poor", if any one piece was broken.

(5) Appearance

Test pieces of 60×60×3 mm with 78 mm in dia., 0.1 m in radius of curvature and 1.2 m in central thickness were prepared. Appearance is shown by "G" for "good", when a piece has no imperfection such as stria, distortion and separation, but it is shown by "P" for "poor" if such imperfection was recognized.

EXAMPLES 1 TO 14

Polymerizable compositions were prepared in the composition ratio (by weight) shown in Table 1, and to 100 parts by weight thereof, dibutyl tin dilaurate was added by 0.025 wt. % as urethane polymerization initiator and stirred for 5 hours at 60° C. to prepolymerize the hydroxyl group and isocyanate group, and the dissolved gas was sufficiently degassed while stirring for 5 minutes at room temperature by evacuating at 5 Torr. In succession, 0.01 wt. % of azobis(2,4-dimethylvaleronitrile) and 0.1 wt. % of azobis(isobutyronitrile) were added as radical polymerization initiator, and the completely dissolved resin solution was injected into a mold composed of two glass plates and gasket, thereby polymerizing. Herein, for preparation of samples for measurement of refractive index, Abbe's number, specific gravity and degree of yellowness, a molding pattern for obtaining a polymer of 60 mm×60 mm×3 mm was used, and for preparation of sample for testing of impact strength, a mold for obtaining a polymer of 78 mm in diameter, 0.1 mm in radius of curvature, and 1.2 mm in central thickness was used. In polymerization, using an air oven, the temperature was gradually raised from 35° C. to 90° C. in 17 hours, and held at 90° C. for an hour, and then gradually cooled to 60° C. Characteristic values of the obtained polymers are shown in Table 1. In all compositions, the refractive index was 1.59 or more and the specific gravity was 1.30 or less, and colorless, transparent formed products without stria, distortion, separation or other defect were obtained. These formed products presented an excellent impact resistance.

COMPARATIVE EXAMPLES 1 TO 4

Polymerizable compositions were prepared in the composition ratio (by weight) shown in Table 2, and were polymerized in the same conditions as in the examples. In the obtained polymers, properties were measured in the same conditions as in the examples, and the impact resistance was tested, of which results are shown in Table 2. In the composition not containing glycidyl ether of substituted phenol, it was difficult to satisfy the target values of both refractive index and specific gravity at the same time, and the improvement of impact resistance was not sufficient. In the composition using diisocyanate, when agitated for 5 hours at 60° C. for pre-polymerization, the viscosity of the liquid was raised extremely, which made it difficult to pour and degas, and hence after pre-polymerization for 3 hours at 45° C., the composition was poured. The obtained formed products were heavy, with the specific gravity of 1.39, and yellowed, and separation and stria were observed.

TABLE 1

| Component | Compound | Examples 1 | 2 | 3 | 4 | 5 | 6 | 7 |
|---|---|---|---|---|---|---|---|---|
| A | TBBPA-GE-DMA | 30 | | 30 | | | | 35 |
|   | TBBPF-GE-DA |   |   |   | 35 |   |   |   |
|   | TBBPS-GE-DMA |   |   |   |   | 40 |   |   |
|   | TBBP-GE-DMA |   | 35 |   |   |   |   |   |
|   | DPBPA-GE-DMA |   |   |   |   |   | 35 |   |
| B | BPA-DEO-DMA | 26 |   | 17 |   |   | 10 | 5 |
|   | BPS-TEO-DMA |   |   |   | 12 |   |   |   |
|   | BPA-TPO-DGE-DMA |   | 10 |   |   |   |   |   |
|   | BPA-DGE-DMA |   |   |   |   | 5 |   |   |
|   | TMPTMA |   |   |   |   |   | 5 | 5 |
|   | DVB |   |   |   |   |   |   | 5 |
|   | DADP |   |   |   |   |   |   |   |
| C | St | 20 |   | 35 | 35 |   |   |   |
|   | VT |   | 40 |   |   | 40 |   | 23 |
|   | ClSt |   |   |   |   |   | 17 |   |
|   | BzMA |   |   |   |   |   |   |   |
|   | DBM |   |   |   |   |   |   |   |
|   | ABZ |   |   |   |   |   |   |   |
| Isocyanate | m-TMI | 14 |   |   |   |   | 18 | 17 |
|   | MAOEI |   | 5 |   |   |   |   |   |
|   | TMXDI |   |   | 8 |   |   |   |   |
|   | XDI |   |   |   | 8 |   |   |   |
|   | HMDI |   |   |   |   | 5 |   |   |
| Glycidyl ether | o-PPG | 10 | 10 | 10 | 10 | 10 |   | 10 |
|   | DBPG |   |   |   |   |   | 15 |   |
| Physical properties of molded material | Refractive index ($n_D$) | 1.591 | 1.592 | 1.593 | 1.594 | 1.592 | 1.593 | 1.594 |
|   | Abbe's number ($V_D$) | 32 | 32 | 32 | 32 | 32 | 32 | 32 |
|   | Sp. gr. (d) | 1.27 | 1.28 | 1.25 | 1.29 | 1.29 | 1.23 | 1.25 |
|   | Degree of yellowness (b*) | 0.7 | 0.7 | 0.8 | 0.9 | 0.9 | 0.8 | 0.9 |
|   | Impact resistance | G | G | G | G | G | G | G |
|   | Appearance of molded material (stria, distortion, separation) | G | G | G | G | G | G | G |

| Component | Compound | Examples 8 | 9 | 10 | 11 | 12 | 13 | 14 |
|---|---|---|---|---|---|---|---|---|
| A | TBBPA-GE-DMA | 30 | 40 | 40 | 40 | 40 | 35 | 20 |
|   | TBBPF-GE-DA |   |   |   |   |   |   |   |
|   | TBBPS-GE-DMA |   |   |   |   |   |   |   |
|   | TBBP-GE-DMA |   |   |   |   |   |   |   |
|   | DPBPA-GE-DMA |   |   |   |   |   |   | 20 |
| B | BPA-DEO-DMA | 20 | 10 | 15 | 10 | 10 | 14 | 25 |
|   | BPS-TEO-DMA |   |   |   |   |   |   |   |
|   | BPA-TPO-DGE-DMA |   |   |   |   |   |   |   |
|   | BPA-DGE-DMA |   |   |   |   |   |   |   |
|   | TMPTMA |   |   |   |   |   |   |   |
|   | DVB |   |   |   |   |   |   |   |
|   | DADP | 10 |   |   |   |   |   |   |
| C | St |   | 5 | 20 |   | 40 | 35 |   |
|   | VT | 16 |   |   | 5 |   |   | 30 |
|   | ClSt |   |   |   |   |   |   |   |
|   | BzMA |   | 5 |   |   |   |   |   |
|   | DBM |   |   | 5 |   |   |   |   |
|   | ABZ |   |   |   | 5 |   |   |   |
| Isocyanate | m-TMI | 14 | 35 | 10 | 35 | 10 |   |   |
|   | MAOEI |   |   |   |   |   |   | 3 |
|   | TMXDI |   |   |   |   |   | 16 |   |
|   | XDI |   |   |   |   |   |   |   |
|   | HMDI |   |   |   |   |   |   | 2 |
| Glycidyl ether | o-PPG | 10 | 5 | 10 | 5 |   |   |   |
|   | DBPG |   |   |   |   |   |   |   |
| Physical properties of molded material | Refractive index ($n_D$) | 1.592 | 1.593 | 1.592 | 1.593 | 1.591 | 1.591 | 1.591 |
|   | Abbe's number ($v_D$) | 32 | 32 | 32 | 32 | 32 | 32 | 32 |
|   | Sp. gr. (d) | 1.24 | 1.28 | 1.29 | 1.28 | 1.29 | 1.29 | 1.25 |
|   | Degree of yellowness (b*) | 0.8 | 0.8 | 0.8 | 0.8 | 0.6 | 0.9 | 0.7 |
|   | Impact resistance | G | G | G | G | G | G | G |
|   | Appearance of molded material (stria, distortion, separation) | G | G | G | G | G | G | G |

TABLE 2

| Component | Compound | Comparative Examples 1 | 2 | 3 | 4 |
|---|---|---|---|---|---|
| A | TBBPA-GE-DMA | 50 | 40 | 56 | 44 |

TABLE 2-continued

| Component | Compound | Comparative Examples 1 | 2 | 3 | 4 |
|---|---|---|---|---|---|
| | TBBPF-GE-DA | | | | |
| | TBBPS-GE-DMA | | | | |
| | TBBP-GE-DMA | | | | |
| | DPBPA-GE-DMA | | | | |
| B | BPA-DEO-DMA | 15 | 25 | | |
| | BPS-TEO-DMA | | | | |
| | BPA-TPO-DGE-DMA | | | | |
| | BPA-DGE-DMA | | | | |
| | TMPTMA | | | | |
| | DVB | | | | |
| | DADP | | | | |
| C | St | 35 | 35 | | 38 |
| | VT | | | 22 | |
| | ClSt | | | | |
| | BzMA | | | | |
| | DBM | | | | |
| | ABZ | | | | |
| Isocyanate | m-TMI | | | | |
| | MAOEI | | | | |
| | TMXDI | | | | |
| | XDI | | | | |
| | HMDI | | | 13 | 9 |
| Glycidyl ether | o-PPG | | | 10 | 10 |
| | DBPG | | | | |
| Physical properties | Refractive index (n$_D$) | 1.591 | 1.588 | 1.596 | 1.590 |
| of molded material | Abbe's number (v$_D$) | 32 | 32 | 32 | 32 |
| | Sp. gr. (d) | 1.35 | 1.30 | 1.39 | 1.31 |
| | Degree of yellowness (b*) | 0.7 | 0.7 | 1.3 | 1.3 |
| | Impact resistance | P | P | G | G |
| Appearance of molded material (stria, distortion, separation) | | P | P | P | P |

Each abbreviation in the tables has the following meaning.

TBBPA-GE-DMA:
Epoxymethacrylate which is obtained by reacting methacrylic acid with epoxy resin obtained from tetrabromobisphenol A and epichlorohydrin. (each n$_2$ of the compound used as compound(II) in examples 1, 3, 7–10 and comparative examples 1–4 is 1.24, n$_2$ of the compound used in example 11 is 1.00, and each n$_2$ of the compound used in examples 12–14 is 3.88.)

TBBPF-GE-DA:
Epoxyacrylate which is obtained by reacting acrylic acid with epoxy resin obtained from tetrabromobisphenol F and epichlorohydrin. (n$_1$ of the compound used as compound(I) in example 4 is 1.44.)

TBBPS-GE-DMA:
Epoxymethacrylate which is obtained by reacting methacrylic acid with epoxy resin obtained from tetrabromobisphenol S and epichlorohydrin. (n$_1$ of the compound used as compound (I) in example 5 is 1.23.)

TBBP-GE-DMA:
Epoxymethacrylate which is obtained by reacting methacrylic acid with epoxy resin obtained from tetrabromobisphenol and epichlorohydrin. (n$_1$ of the compound used as compound (I) in example 2 is 1.25.)

DPBPA-GE-DMA:
Epoxymethacrylate which is obtained by reacting methacrylic acid with epoxy resin obtained from diphenylbisphenol A and epichlorohydrin. (n$_1$ of the compound used as compound(I) in example 6 is 1.06, and n$_1$ of the compound used as conpound(I) in example 14 is 3.41.)

BPS-DEO-DMA:
Bisphenol A bis(2-methacryloyloxyethyl) ether

BPA-TEO-DMA:
Bisphenol S bis(2-(2'-methacryloyl-oxyethoxy)ethyl) ether

BPA-TPO-DEO-DMA:
Bisphenol A bis(2-(3'-methacryloyloxy-2'-hydroxypropoxy)propyl) ether

BPA-DGE-DMA:
Bisphenol A bis(3-methacryloyloxy-2-hydroxypropyl) ether

DVB: Divinylbenzene
DADP: Diallyl diphenate
St: Styrene
VT: Vinyltoluene
ClSt: Chlorostyrene
BzMA: Benzyl methacrylate
DBM: Dibutyl maleate
ABZ: Allyl benzoate
m-TMI: Isopropenyl-α, α-dimethylbenzyl isocyanate
MAOEI: Methacryloyloxyethyl isocyanate
TMXDI: Bis(α, α-dimethylisocyanatomethyl)benzene
XDI: Xylylene diisocyanate
HMDI: Hexamethylene diisocyanate
o-PPG: o-phenylphenyl glycidyl ether
DBPG: 2,4-dibromophenyl glycidyl ether

What is claimed is:

1. A polymerizable composition constituted by adding isocyanate by 0.1 to 2 equivalent to the alcoholic hydroxyl group in a mixture dissolving component A prescribed below by 20 to 60 parts by weight to a total of 80 to 40 parts by weight of component B and component C in the ratio specified below:

[Component A]
A multifunctional (meth)acrylate possessing at least one alcoholic hydroxyl group, and also possessing at least one aromatic ring replaced by at least one halogen atom other than fluorine or phenyl group, and two or more (meth)acryloyl groups in a molecule:

[Component B[
A multifunctional (meth)acrylate possessing at least one aromatic ring having neither halogen atom nor phenyl group as substituent, and posessing two or more (meth)acryloyl groups in a molecule, or a mixture of radically polymerizable multifunctional unsaturated monomer including the compound; 5 to 80 wt. %:

[Component C]

A mixed solution of a styrene type compound, or a radically polymerizable monofunctional unsaturated monomer including the compound; 95 to 20 wt. %.

2. A polymerizable composition according to claim 1, which further comprises 5–20 parts by weight of glycidyl ether of substituted phenol per 100 parts by weight of the polymerizable composition of claim 1.

3. A polymerizable composition according to claim 1 or 2, wherein the component A is a compound shown by the following general formula(I)

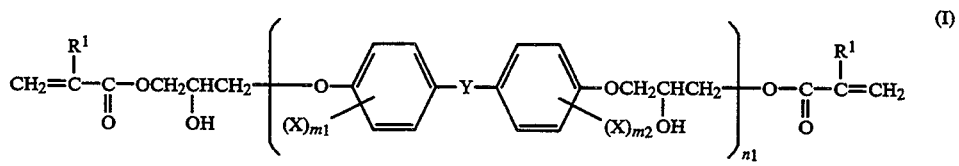

Wherein $R^1$ is a hydrogen atom or a methyl group, X is a halogen atom other than fluorine or phenyl group, $Y^1$ is —C(CH$_3$)$_2$—, —CH$_2$—, —SO$_2$— or single bond, each of $m_1$ and $m_2$ is an integer of 1 or 2, which may be identical or different, and $n_1$ is a number of 1–6.

4. A polymerizable composition according to claim 3, wherein the component A is a compound shown by the following general formula(II)

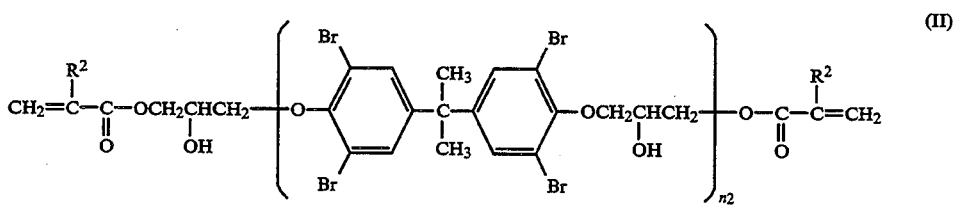

Wherein $R^2$ is a hydrogen atom or a methyl group, and $n_2$ is a number of 1–6.

5. A polymerizable composition according to claim 1 or 2, wherein the multifunctional (meth)acrylate in the component B is a compound shown by the following general formula(III)

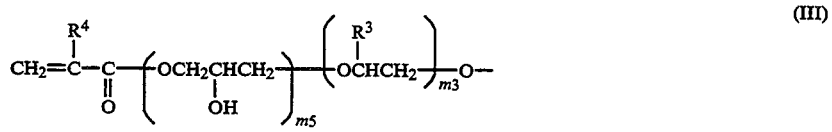

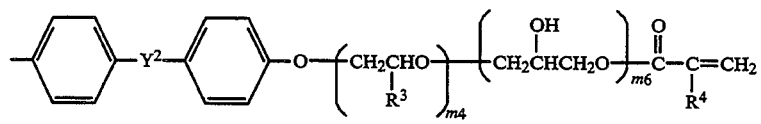

Wherein each of $R^3$ and $R^4$ is a hydrogen atom or a methyl group, $Y^2$ is —C(CH$_3$)$_2$—, —CH$_2$—, —SO$_2$— or single bond, each of $m_3$ and $m_4$, which may be identical or different, is an integer such that the sum thereof is 2–30, and each of $m_5$ and $m_6$, which may be identical or different, is 0 or 1.

6. A polymerizable composition according to claim 5, wherein the multifunctional (meth)acrylate in the component B is a compound shown by the following general formula(IV)

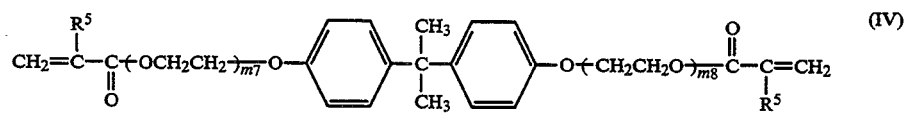

Wherein $R^5$ is a hydrogen atom or a methyl group, and each of $m_7$ and $m_8$, which may be identical or different, is an integer such that the sum thereof is 2–30.

7. A polymerizable composition according to claim 1 or 2, wherein the multifunctional (meth)acrylate in the component B is a compound shown by the following general formula(V)

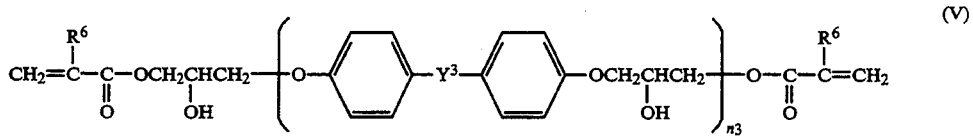

Wherein $R^6$ is a hydrogen atom or a methyl group, $Y^3$ is $-C(CH_3)_2-$, $-CH_2-$, $-SO_2-$ or single bond, and $n_3$ is a number of 1-6.

8. A polymerizable composition according to claim 1 or 2, wherein the styrene type compound in the component C is styrene, vinyltoluene, chlorostyrene or the mixture thereof.

9. A polymerizable composition according to claim 1 or 2, wherein the isocyanate is a radically polymerizable monoisocyanate or the mixture thereof shown by the following general formula(VI).

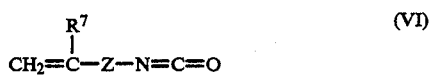

Wherein $R^7$ is a hydrogen atom or a methyl group, Z is

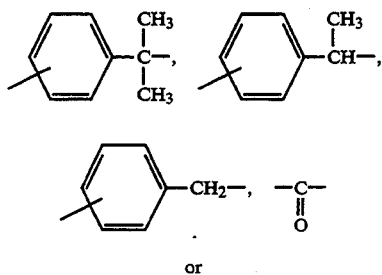

-continued
$$-\underset{\underset{O}{\|}}{C}-CH_2CH_2-$$

10. A polymerizable composition according to claim 9, wherein the radically polymerizable monoisocyanate is isopropenyl-α, α-dimethylbenzyl isocyanate.

11. A polymerizable composition according to claim 1 or 2, wherein the isocyanate is a polyisocyanate selected from the group consisting of xylylene diisocyanate, bis(α, α-dimethylisocyanatomethyl)benzene, tris(α, α-dimethylisocyanatomethyl)benzene, hexamethylene diisocyanate, trimethylhexamethylene diisocyanate, lysine diisocyanate, cyclohexane diisocyanate, bis(isocyanatomethyl)cyclohexane, isophorone diisocyanate, bis(isocyanatocyclohexyl)methane, 2, 2-bis-(isocyanatocyclohexyl)propane and the mixture thereof.

12. A polymerizable composition according to claim 2, wherein the glycidyl ether of substituted phenol is phenyl substituted phenyl glycidyl ether or the mixture thereof.

13. A polymerizable composition according to claim 12, wherein the phenyl substituted phenyl glycidylether is o- phenylphenyl glycidyl ether.

14. A plastic lens being excellent in impact resistance and high in refractive index which is obtained by copolymerization of the polymerizable composition according to claim 1 or 2 in the presence of at least one radical polymerization initiator and at least one urethane polymerization initiator.

15. A plastic lens according to claim 14, wherein a combination of at least two radical polymerization initiators differing in the decomposition temperature each other is used.

* * * * *